United States Patent [19]

Moerman

[11] 4,167,037

[45] Sep. 4, 1979

[54] APPARATUS FOR DC/AC POWER CONVERSION BY ELECTROMAGNETIC INDUCTION

[76] Inventor: Nathan A. Moerman, 7310 Maple Ave., Chevy Chase, Md. 20015

[21] Appl. No.: 849,564

[22] Filed: Nov. 8, 1977

Related U.S. Application Data

[62] Division of Ser. No. 762,896, Jan. 26, 1977, Pat. No. 4,112,347, which is a division of Ser. No. 635,007, Nov. 25, 1975, Pat. No. 4,020,440.

[51] Int. Cl.[2] .............................................. H02M 7/00

[52] U.S. Cl. .......................................... 363/79; 323/6; 323/48; 323/56; 323/61; 363/75

[58] Field of Search .................... 323/6, 40, 48, 56, 57, 323/58, 60, 61; 363/74, 75, 95, 40, 79

[56] References Cited

U.S. PATENT DOCUMENTS 3,403,323 9/1968 Wanlass .................................. 323/6

*Primary Examiner*—William M. Shoop

*Attorney, Agent, or Firm*—Thomas O. Maser

[57] ABSTRACT

Apparatus for direct current to alternating current power conversion by means of progressive variation of magnetic flux in associated magnetic paths. A direct current input is subdivided into power pulses in two permeance controlled transformers. The pulses are modified, stabilized and recombined in phase opposition to produce a single alternating current output.

2 Claims, 2 Drawing Figures

APPARATUS FOR DC/AC POWER CONVERSION BY ELECTROMAGNETIC INDUCTION

GOVERNMENT USE

The invention described herein may be manufactured and used by or for the government of the United States of America for governmental purposes without the payment to me of any royalties thereon.

This is a division of application Ser. No. 762,896 filed Jan. 26, 1977, now U.S. Pat. No. 4,112,347 which, in turn was a division of application Ser. No. 635,007 filed Nov. 25, 1975, now U.S. Pat. No. 4,020,440.

RELATED PATENT

This invention is closely related to my U.S. Pat. No. 4,020,440 issued Apr. 26, 1977, which is incorporated by reference.

FIELD OF THE INVENTION

This invention relates to the field of control of electrical energy, and more specifically to direct current to alternating current power conversion by static magnetic means.

SUMMARY

Control of magnetic flux in a closed magnetic path is accomplished by the progressive control of permeance in an assigned section of the path. Several configurations for continuous permeance control by progressive saturation and/or domain rotation are described in my related U.S. Pat. No. 4,020,440.

Utilizing this technology, I have developed a unique apparatus for DC/AC power conversion by purely static magnetic means. More specifically, in a direct to alternating current power converter two identical permeance controlled direct current power pulse transformers are alternately switched in a time sequence controlled by the zero crossover points of the input reference alternating current waveform. In this way the direct current power input is subdivided into consecutive power pulses that are modified within the direct current power pulse transformers, under control of the input alternating current reference signal and feedback system, into the desired waveform, typically sinewave. The addition of a closed loop feedback system stabilizes the output and enables control of amplitude through internal or external means. The combined outputs of the two transformers, connected in phase opposition, produce a continuous alternating current power waveform.

It is, therefore, an object of this invention to provide electrical power control by controlled electromagnetic induction.

Still another object of this invention is to provide a controlled electromagnetic induction means for direct to alternating current power conversion and control.

Still another object of this invention is to generate, by static means, polyphase alternating current power from direct or alternating current power at any frequency.

Another object of this invention is to reduce size and weight of electrical conversion and control structures by the generation, conversion and control of high frequency electrical power.

A still further object of this invention is to provide an electric power control means responsive to a sensed physical state, such as: voltage, current, power, temperature, pressure, strain, humidity, acidity, or the like.

An object of this invention is to convert constant current power sources to other forms of electrical energy.

Another object of this invention is to provide control of electrical power by electronic control of magnetic means in static configurations.

An object of this invention is to provide the means for the computer control of power subsystems in an electric power network.

Still another object of this invention is to provide means for control of voltage, current, and phase of a power subsystem of an electrical power network.

DESCRIPTION OF A PREFERRED EMBODIMENT

DIRECT TO ALTERNATING CURRENT POWER CONVERTER OF FIG. 1

Figure 1:
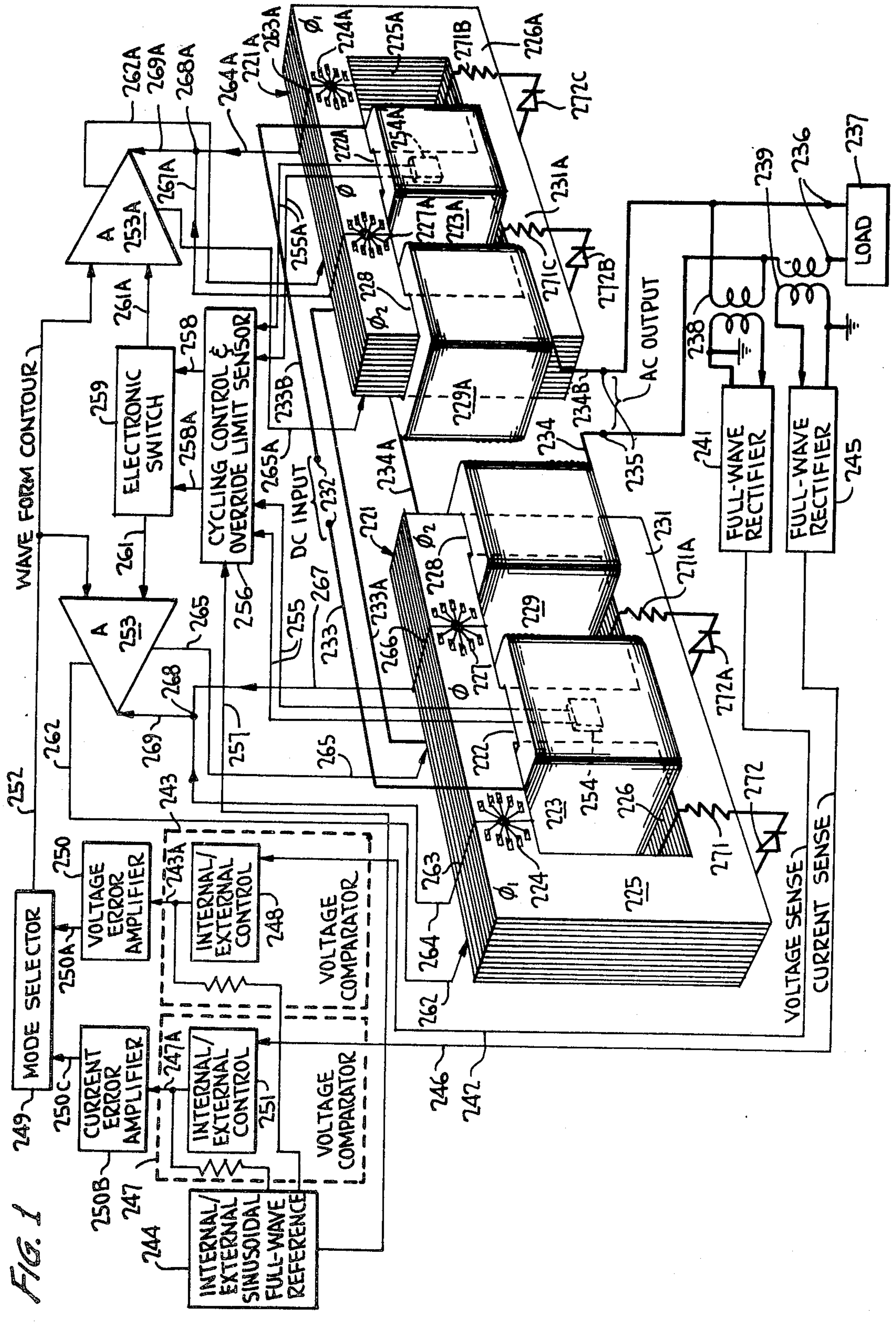
FIG. 1 shows a direct to alternating current power converter.

FIG. 1 shows the direct to alternating current power converter of this invention. Two identical three legged magnetic cores 221 and 221A are used to provide for the subdivision of direct current input power into a series of alternating current power pulses by means of alternated operation between the two identical magnetic structures.

In this invention, direct current power is transformed into alternating current power of sine waveform by a controlled magnetic circuit configuration which, in addition, provides power control capabilities through an integrated feedback system to satisfy specific load characteristics. This is a unique combination and advances the state of the art beyond that currently practiced which entails, among other limiting elements, separate function elements as switching transistors, silicon controlled rectifiers, or plasma discharge devices, a voltage coupling transformer, and a low pass or resonant filter.

Conversion and control is accomplished by subdividing the input direct current power into consecutive power pulses through the medium of the alternately activated permeance controlled power pulse transformers and then transforming such power pulses into consecutive positive and negative lobes of sine waveform which are then combined at the output circuit. In this way a low level sine waveform reference signal, injected into the feedback system, is amplified into alternating current power. This power control flexibility enables, in general, the transformation of direct current power to a range of predetermined alternating waveforms, and operation at a range of frequencies, limited only by the availability of permeable magnetic materials for the highest frequency structures.

In the design of practical systems, the transformer-like construction of the magnetic elements permits scaling of power levels, voltage, and current to values limited only by the state of the art in power transformer technology. Additionally, polyphase interconnection, typically three phase, is simply made by the wye or delta connection of the outputs of three single phase converters with an alternating current sine waveform reference signal appropriately phased.

The flux excursion in each transformer core structure is limited to approximately one half of the flux excursion within a conventional alternating current power transformer for the same power frequency. This inefficiency in core utilization must be assessed in terms of overall performance advantages in a system tradeoff consideration.

A unique direct to alternating current conversion principle emerges from this invention that permits the generation of low frequency power, typically 60 Hertz, from a direct current power source, with much smaller magnetic components than would be previously dictated by the 60 Hertz requirement. By the arbitrary selection of small magnetic structures, size of such structures determines the power frequency that can be supported. Self generation of high frequency power is determined solely by structure size and magnetic properties. Power at this frequency is then modulated fully by a control signal frequency of the desired 60 Hertz through the feedback control system. The 60 Hertz power is derived from the modulated power envelope by alternately switched controlled rectifier pairs which extract the positive and negative lobes, respectively, of 60 Hertz power.

An important contribution of this invention is that this system makes use of static magnetic devices to generate sine waveform power.

The two identical three legged magnetic cores 221 and 221A are the same in structure and in operational capabilities. Referring to one of the cores, 221, for purposes of explanation, the structure constitutes a pair of magnetic paths through which flux can be controllably routed for generating sine waveform pulses from timed pulses of direct current flux generating inputs. A center leg 222 has input winding 223 therearound. A closed bypass path includes the permeance control section 224, bypass leg 225, connection arm 226 and center leg 222. A closed output path includes a second permeance control section 227, output leg 228 with output winding 229 therearound, connecting arm 231, and center leg 222.

Direct current is applied as an input to this device to terminals 232 through input lead 233 to winding 223 and on through lead 233A to winding 223A and through lead 233B back to terminals 232. The leads 233, 233A and 233B connect windings 223 and 223A in series. Output windings 229 and 229A are also serially phase-opposing connected through leads 234, winding 229, lead 234A, winding 229A, and lead 234B. Output terminals 235 are cross lead 234 and 234B. To output load terminals 236 is connected load 237. Between the output terminals 235 and load terminals 236 are connected a voltage sensing transformer 238, with primary windings thereof connected across the output leads 234 and 234B, and a current sensing transformer 239, with primary windings thereof connected in series with the grounded side of output 234 and the corresponding load terminal 236. The secondary winding of the voltage sensing transformer 238 is connected as an input to a full wave rectifier 241 which presents an input through connector 242 to a voltage comparator 243 wherein the voltage representation of the system output is compared with a voltage signal from an internal or external sinusoidal fullwave reference source 244. The secondary winding of current sensing transformer 239 is connected as an input to a second fullwave rectifier 245 which presents an input through connector 246 to a voltage comparator 247, wherein the current representation of the system output is compared with an internal or external sinusoidal fullwave reference source 244. Internal or external control 248 in voltage comparator 243 is used to provide the set points for the comparator. This is in the form of an amplitude adjustment. Voltage comparator 243 produces an error signal indicative of the voltage variations in the output of the system and supplies such information through voltage error amplifier 250 as an input to a mode selector 249 through a connector 250A. Voltage comparator 247 has an internal or external control 251 which is used to provide the set points for the comparator. The output of such voltage comparator 247 is an error signal indicative of the current variations in the output of the system and supplies such information when dictated by load conditions as a second input through current error amplifier 250B and a connector 250C to mode selector 249. Voltage or current control selected by the mode selector is determined by the respective set points in relation to load conditions. Lead 252 is connected to the output of the mode selector 249 and extends to be one of the inputs to each of a pair of complementary drive, flux apportioning amplifiers 253 and 253A.

A flux density sensor 254 is secured to center leg 222 of core 221 in such a manner as to be responsive to flux density changes within such leg 222. A pair of connector leads 255 connects the output of sensor 254 as a first input to a cycling control and override limit sensor 256. A second flux density sensor 254A is secured to center leg 222A of core 221A like sensor 254 is connected to leg 222. A pair of connector leads 255A connects the output of sensor 254A as a second input to cycling control and override limit sensor 256. A connector 257 connects an output of the internal or external sinusoidal fullwave reference 244 as a third input to the cycling control and override limit sensor 256. An electronic switch 259 has two input connectors 258A and 258 which are also connected as outputs of the cycling control and override limit sensor 256 and two output leads 261 and 261A. Output lead 261 is connected as a second input to amplifier 253 and output lead 261A is connected as a second input to amplifier 253A.

Amplifier 253 has a first output lead 262 which is connected to one end of a coil 263 of permeance control section 224. The other end of coil 263 is connected to a lead 264. Amplifier 253 has a second output lead 265 which is connected to one end of a coil 266 of permeance control section 227. The other end of coil 266 is connected to a lead 267. Leads 264 and 267 are joined at junction 268 to which also is connected a connector 269. Connector 269 is the return lead to amplifier 253. Amplifier 253A is connected to permeance control sections 224A and 227A in the same manner that amplifier 253 is connected to permeance control sections 224 and 227, with equivalent elements having the letter A added to identical numbers.

A reverse transient suppressor 271 with its unidirectional current device 272 is mounted around leg 226. A second reverse transient suppressor 271A with its unidirectional current device 272A is mounted around leg 231, both of said first two suppressors being mounted on core 221. A third reverse transient suppressor 271C with its unidirectional current device 272B is mounted around leg 231A. The fourth suppressor and current device are mounted around leg 226A on core 221A.

OPERATION OF THE DIRECT TO ALTERNATING CURRENT CONVERTER OF FIG. 1

Direct current power applied to terminals 232 is distributed alternately between input windings 223 and 223A by a commutation process. With a structure 221 in the active state nearly all of the applied direct current input power is transmitted through its input winding 223. The input winding of structure 221A, in its inactive state, absorbs negligible power since its associated magnetic core permeance is at its minimum value.

Figure 2:
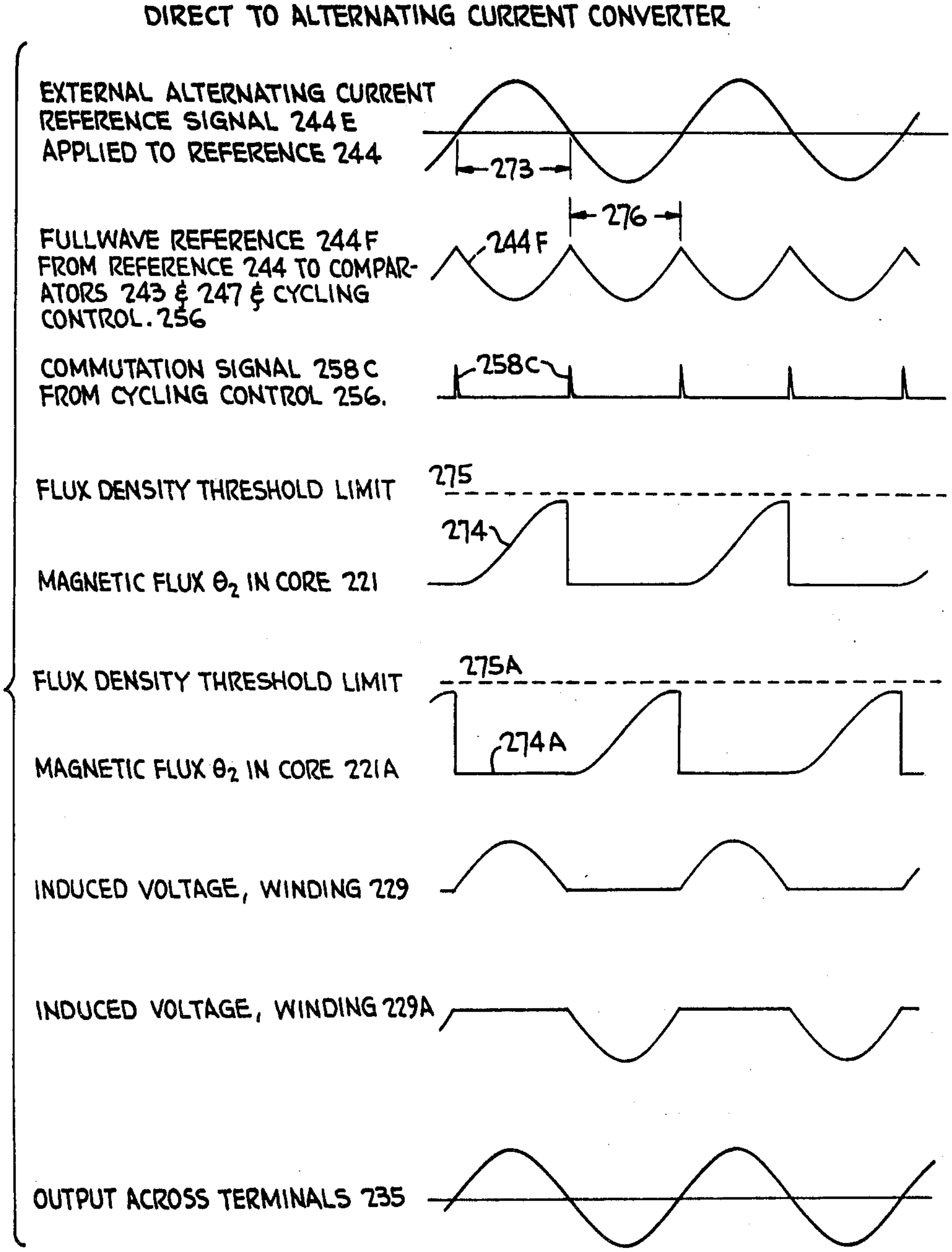
FIG. 2 is a time sequence chart for the operation of the converter of FIG. 1.

The time sequence chart in FIG. 2 illustrates the operation of the converter of FIG. 1.

In the time sequence chart of FIG. 2, the topmost illustrated signal represents a typical external alternating current reference signal 244E which is applied to the reference 244. The half cycle shown in interval 273 illustrates the positive half cycle of such external reference signal 244E. Within the internal or external sinusoidal fullwave reference 244, the reference signal 244E is changed, as is any external or internal reference signal source passing therethrough, into a fullwave reference signal 244F. Signal 244F is applied as inputs to the comparators 243 and 247 and to cycling control 256. Within cycling control 256, the fullwave 244F are used to produce the commutation trigger signals 258C which are delivered through connectors 258 and 258A as controlling inputs to the electronic switch 259.

Electronic switch 259 functions to activate, alternately, flux apportioning amplifier 253 and flux apportioning amplifier 253A. This results in the alternated operation of the two magnetic cores 221 and 221A. The magnetic flux $\theta_2$ 274 in leg 228 of core 221, for example, is illustrated by waveform 274 wherein the flux density increases sinusoidally to a maximum within the first interval 273 as shown in the time sequence chart of FIG. 2. It is to be noted that during this first interval, the magnetic flux $\theta_2$ 274A in leg 228A of core 221A is at a relatively zero level and effectively inactive. The flux density threshold limit 275 and 275A is set into override limit sensor 256 whereby, when the flux level sensed by flux density sensors 254 and 254A reaches such limit, the override limit sensor 256 will assume control in the event of a failure of reference 244, to limit the operation of the system to a safe condition. During the second interval of the time sequence chart of FIG. 2, the magnetic flux in leg 228 is at relatively zero level while the flux in 228A increases sinusoidally to a maximum. Also, in the first interval 273, the induced voltage in output winding 229 rises to form one half of the output sinewave while the induced voltage in output winding 229A is at relatively zero level. In the succeeding interval 276, the induced voltage in the reverse phased output winding 229A rises to form the negative half of the output sinewave while the induced voltage in output winding 229 is at relatively zero level. The interconnection of lead 234, winding 229, lead 234A, winding 229A and lead 234B combine these two half sinewaves to produce the full sinewave output available at output terminals 235.

Stated another way, the onset of the high permeance state of structure 221 causes a rise in magnetic flux from the magnetomotive force developed by input winding 223. The rise in flux is coupled to the output path 228 and bypass path in the proportion dictated, typically, by a sinewave form signal through the voltage comparator 243 or 247 and permeance control flux apportioning amplifier 253. The rising flux coupling the output winding 229 generates the output voltage which serves the load requirement. The sine waveform lobe induced in winding 229 is followed by a contiguous sinewave lobe of opposite polarity induced in reverse phased winding 229A during the following activation of magnetic structure 221A. The series apposed output windings 229 and 229A combine the alternate sinewave output power pulses into sinusoidal alternating current power.

Voltage feedback and current feedback signals over leads 242 and 246, respectively, are processed by the fullwave rectifiers 241 and 245, respectively, to produce fullwave unidirectional sine waveforms for application to the respective voltage comparators 243 and 246, where the deviation of the sinewave form and the amplitude output from the sine waveform control signal 244 appears as an error signal at connections 243A and 247A for voltage and current, respectively. These error signals are amplified by their respective error amplifiers 250 and 250B, the outputs of which are combined in mode selector 249 which establishes either a voltage or current control operation mode as determined by the respective control setting at the voltage comparators 243 and 247 in combination with the demand of the load connected to output terminals 235.

Sine waveform reference source 244 supplies fullwave unidirectional waveforms to each voltage comparator 243 and 247 and of opposite polarity to the feedback voltages. In addition, the fullwave unidirectional waveform is applied as an input to the cycling control 256. The cycling control 256 generates the commutating signal 258C for electronic switch 259 from the zero crossover points of the fullwave reference signal from 244. Signals from flux density sensors 254 and 254A are applied to the override limit sensing function of 256 and serve as a safety override in the event of reference signal failure.

To minimize the response time feedback system to output variation and switching activations, the permeance control drive amplifier is designed with a constant current control characteristic. The inherent high dynamic resistance of this configuration greatly diminishes the reluctance over resistance time constant of the permeance control circuit.

Although the previous description covers sine waveform generation, the invention is sufficiently versatile to enable the conversion from direct current to virtually any arbitrary alternating waveform, that is to say, squarewave, sawtooth waveform, triangular waveform, and the like.

A simpler configuration of the invention is afforded for squarewave alternating current generation by eliminating the feedback circuitry and applying external commutating pulses to the commutating switch 259, through cycling control 256. These external commutating pulses must have a period less than the inherent rise time of flux in core 221 and 221A up to the point where the flux density sensor 254 or 254A signals the termination of the period.

Magnetic energy stored throughout the activated period in a pulse transformer is normally dissipated as thermal energy in the reverse transient suppressors 271, 271A, 271B, and 271C. During the transitional period at the time of commutation between pulse transformers. In large power handling equipment, this stored energy may be economically recovered by charging a capacitor bank or secondary battery to provide a power source for accessory applications.

The direct to alternating power converter as described herein is uniquely applicable as the terminal subsystem of the direct current power transmission system and for the conversion of electrical power derived from advanced primary energy converters, which are inherently direct current generators. These advanced sources are: magnetohydrodynamic generators, electrofluiddynamic generators, thermionic and thermoelectric generators, solar cells, and the projected controlled thermonuclear fusion direct conversion generators.

As an electrical energy coupling means to supply the input of an electrical power transmission system or its terminal subsystem converter, permits the introduction of external control means to effect the management of network power distribution and control by computer or other automatic means.

Alternating current power generated by conversion from a direct current power source is required to be of sine waveform for most applications and, furthermore, be stabilized and adjustable over a wide range of voltage and current. In this invention, these requirements are completely satisfied by commutated permeance controlled pulse transformers, which subdivide the direct current input power into consecutive power pulses. Controlled electric induction in each of the pulse transformers is accomplished through a feedback system including a stabilized reference waveform and a means for internal or external voltage or current adjustment. The combined output of the commutated pulse transformers forms the useful alternating current power source.

I claim:

1. In an electromagnetic induction means for the conversion of direct current power to alternating current power;

a first and a second identical electrical power pulse transformer means having a plurality of variable permeance closed magnetic paths, each of said identical means having an input path means, an output path means, a bypass path means, an input winding means on said input path means, an output winding means on said output path means, a first electromagnetically coupled variable permeance control means between said input path means and said output path means, a second electromagnetically coupled variable permeance control means between said input path means and said bypass path means, a pair of direct current source terminal means, a means connecting said first and second input winding means in series with said pair of direct current source terminal means, a current sensing means, a voltage sensing means, a first and a second alternating current output terminal means;

a means connecting said first and second output winding means in series opposing configuration;

a first, second, third and fourth reverse transient suppression means, each having a winding means, and a unidirectional current flow and energy absorbing means, said first suppression means surrounding said bypass path means of said first identical means, said second suppression means surrounding said output path means of said first identical means, said third suppression means surrounding said bypass path means of said second identical means, said fourth suppression means surrounding said output path means of said second identical means, a first voltage comparator means having a alternating current reference voltage means and an output voltage setting means producing a voltage error output signal, a voltage feedback means connecting said voltage sensing means to said first voltage comparator means and coupling said voltage sensing means to said output terminals, a second voltage comparator means having an alternating current reference voltage means and an output setting means producing a current error output signal, a current feedback means connecting said current sensing means and said second voltage comparator means and coupling said current sensing means to said first output terminal means, means connecting said reference voltage as an input to said first and second voltage comparator means, an operating mode selector means, means connecting the voltage error signal output of said first voltage comparator means as a first input to said operating mode selector means, means connecting the current error signal output of said second voltage comparator means as a second input to said operating mode selector means, a first and a second complementary control amplifier means, means connecting the output of said operating mode selector means as the first input to both of said amplifier means, means connecting the complementary control outputs of said first amplifier means to said first and second variable permeance control means in said first identical means, means connecting the complementary control outputs of said second amplifier means to said first and second variable permeance control means in said second identical means, a first flux density sensing means magnetically coupled to said input path means of said first identical means, a second flux density sensing means magnetically coupled to said input path means of said second identical means, a cycling control and override limit sensor having a pair of alternately pulsed output means, means connecting said reference voltage as an input to said cycling control and override limit sensor, an electronic switch means having a first and a second alternating signal output means, means connecting the output of said first flux density sensor as a first input to said cycling control and override limit sensor, means connecting the output of said second flux density sensor as a second input to said cycling control and override limit sensor, means connecting the outputs of said cycling control and override limit sensor as the controlling inputs to said electronic switch means, means connecting said first output of said electronic switch means as a second input to said first amplifier means, means connecting said second output of said electronic switch means as a second input to said second amplifier means, whereby said electronic switch is enabled by actuating control signals from the zero crossover points of the said alternating current reference voltage and in the absence thereof, by a protective override control signal in response to the outputs of said flux density sensors, and whereby the alternating current output across said output terminal means is a series of out-of-phase contiguous shaped power pulse lobes to produce an alternating sine wave output.

2. In a means for converting direct current power to alternating current power, a first and a second identical electrical power pulse transformer each having a plurality of variable permeance closed magnetic paths, an input winding and an output winding, a direct current input connected to each of said input windings, permeance control means connected to each of said transformers for alternately varying the flux in said closed magnetic paths from zero to a maximum value in a sinusoidal manner, whereby the induced voltage in a first said output winding is varied from zero through a maximum value and back to zero to produce a positive half sinewave while the induced voltage in the second said output winding is alternately varied from zero through a minimum value and back to zero to produce a negative half sinewave, and means for combining said induced voltages to produce a full sinewave output.

* * * * *